UNITED STATES PATENT OFFICE.

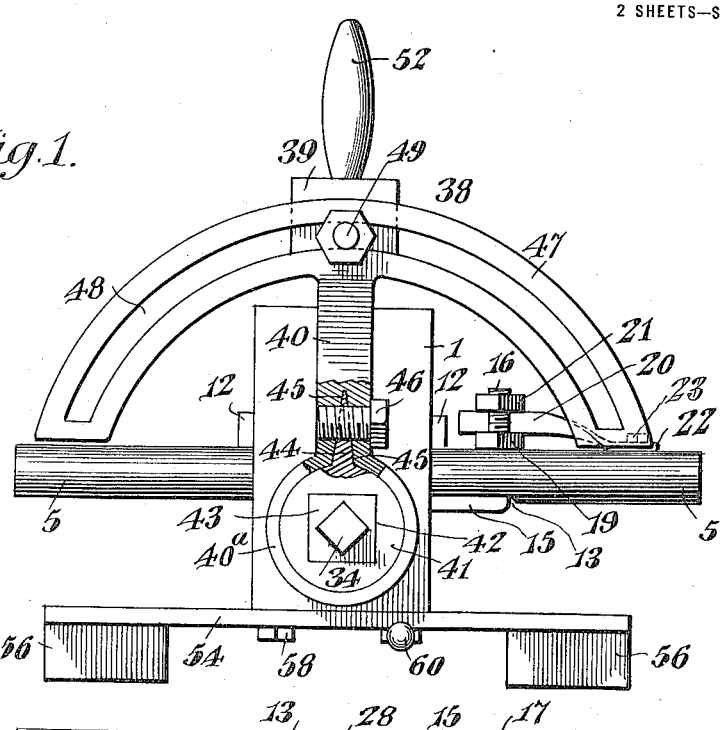
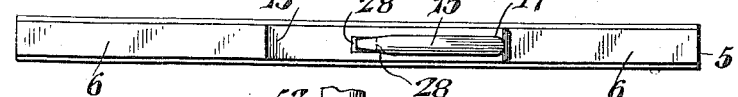
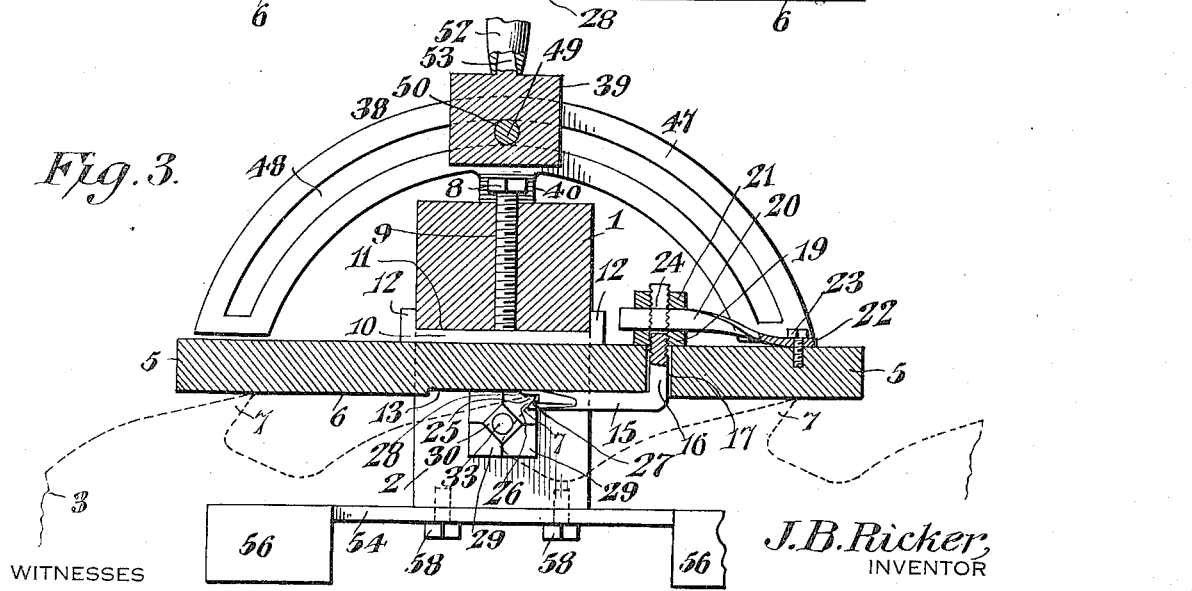

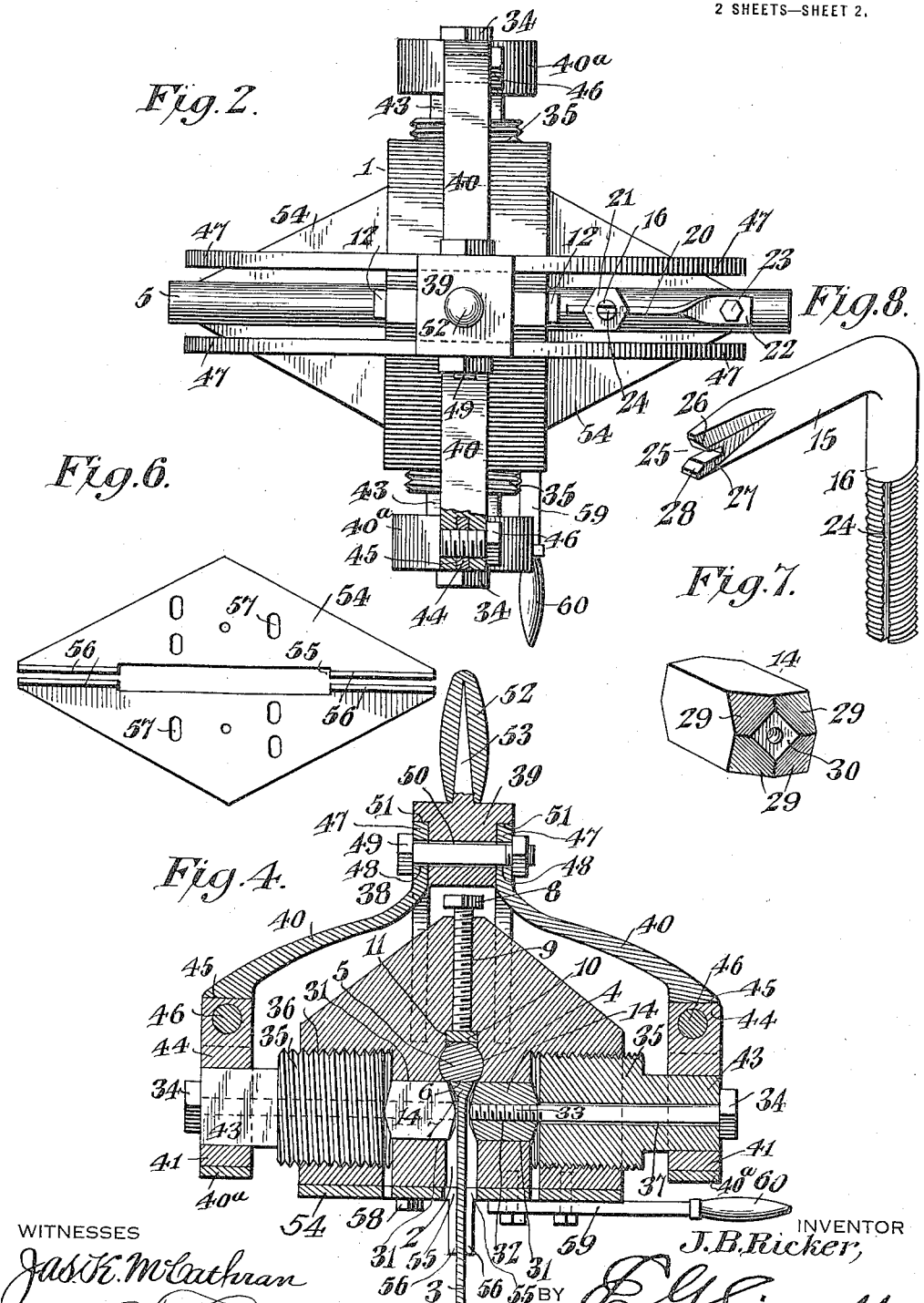

JEROME B. RICKER, OF ST. MARIES, IDAHO.

SHAPER FOR SWAGED SAW-TEETH.

1,153,444.  Specification of Letters Patent.  Patented Sept. 14, 1915.

Application filed June 4, 1914. Serial No. 842,976.

*To all whom it may concern:*

Be it known that I, JEROME B. RICKER, a citizen of the United States, residing at St. Maries, in the county of Kootenai and State of Idaho, have invented a new and useful Shaper for Swaged Saw-Teeth, of which the following is a specification.

The invention relates to a device for shaping swaged saw teeth.

The object of the present invention is to improve the construction of devices for shaping or side dressing saw teeth after they have been swaged, and to provide a simple, efficient, and comparatively inexpensive shaper of strong and durable construction, capable of ready adjustment for operating on saw teeth of different sizes or gages, and adapted to uniformly shape the teeth and leave the same straight, with every point the same size.

A further object of the invention is to provide a shaper of this character capable of ready adjustment to vary the degree of swage and adapted to bevel the teeth at the face and back and leave the same the widest at the point.

Another object of the invention is to provide a shaper equipped with an oscillatory operating device and capable of having the parts reversed, whereby the said device may be operated by either pulling it toward the operator or shoving it from the operator.

The invention also has for its object to provide a shaper equipped with reversible dies having a plurality of engaging faces at each end and adapted to operate against the sides of the saw teeth without bearing against the saw below the throat.

With these and other objects in view the invention consists in the construction and novel combination of parts hereinafter fully described, illustrated in the accompanying drawings, and pointed out in the claims hereto appended, it being understood that various changes in the form, proportion, size and minor details of construction, within the scope of the claims, may be resorted to without departing from the spirit or sacrificing any of the advantages of the invention.

In the drawings:—Figure 1 is a side elevation of a saw shaper constructed in accordance with this invention. Fig. 2 is a plan view of the same. Fig. 3 is a longitudinal sectional view of the saw shaper. Fig. 4 is a central transverse sectional view of the same. Fig. 5 is a reverse plan view of the gage bar. Fig. 6 is a detail view of the guide plates. Fig. 7 is a detail perspective view of one of the shaping dies. Fig. 8 is a detail perspective view of the tooth stop.

Like numerals of reference designate corresponding parts in all the figures of the drawings.

In the accompanying drawings, in which is illustrated the preferred embodiment of the invention, 1 designates a block constituting the body or frame of the shaper and provided with a central vertical opening 2 extending upwardly from the lower face of the block or body and adapted to receive a saw blade 3. The vertical opening is enlarged at the top and rounded to provide a way 4 for the reception of a longitudinally adjustable gage bar 5, which is segmental in cross section to conform to the configuration of the way 4 and to present a lower flat face 6 to the teeth 7 of the saw 3. The gage bar, by being segmental in cross section, is capable of rotary adjustment in the way of the body, so as to arrange its flat lower face in proper position. The gage bar, which is adjustable backwardly and forwardly to vary the amount of the swage, as hereinafter fully explained, is secured in its adjustment by a set screw 8, mounted in a central vertical threaded bore 9 and engaging a clamping plate 10. The clamping plate 10, which is mounted in an extension or groove 11 of the way 4, extends from the front to the rear face of the block and has upturned terminals 12 fitting against the said faces and adapted to prevent longitudinal displacement of the plate 10. The plate 10, which is forced into frictional engagement with the gage bar by the set screw, is adapted to prevent the same from being notched by the excessive pressure of the set screw, so that the upper rounded face of the gage bar will remain perfectly smooth and enable an accurate adjustment of the gage bar to be made. The gage bar, which is constructed of hardened steel or other suitable material, has its terminal portions resting upon the saw teeth when the shaper is in use, and the said gage bar is provided in its lower face with a central recess 13, located between the terminal tooth contacting portions and having its top wall arranged clear of a pair of transversely disposed shaping dies 14, which are adapted to move inwardly beneath the gage bar.

The gage bar carries a tooth stop 15, extending longitudinally of the gage bar from one end of the intermediate recess 13, and provided with a vertical stem 16, constituting a pivot and mounted in a vertical opening 17 in the gage bar 5. The tooth stop, which is L-shaped, is secured in the vertical opening 17 by a nut 19, located below the free terminal portion of a spring 20, which is engaged by an upper nut 21. The spring 20, which has a smooth attaching portion 22 to fit the rounded upper face of the gage bar, is secured to the same by a screw 23 or other suitable fastening device, and it is bent or flexed at an intermediate point to arrange its free terminal portion so that the side faces thereof will be disposed in a vertical plane. The terminal portion of the spring extends through a slot 24 in the upper portion of the stem 16, which is threaded for the reception of the nuts 19 and 21. The lower horizontal body portion of the saw stop is yieldably maintained in a central longitudinal position by the spring, which permits the saw stop to be deflected for enabling a tooth to pass its engaging end. The tooth stop is provided at its engaging end with a tapering recess 25, having an inclined lower face or wall 26 and an upper approximately horizontal face or wall 27, which is beveled at its outer terminal portion 28 to enable it to be readily arranged upon a saw tooth. The point of the tooth extends into the recess of the saw stop, which rests upon the top of the tooth, and engages beneath the tooth and exposes the side face of the tooth to the shaping action of the dies. The saw teeth, after being operated on by a swager, have a considerable lack of uniformity, and the particular construction of the saw stop enables the saw teeth to be accurately shaped or dressed to the same gage, so that they will be perfectly uniform and in longitudinal alinement. The gage bar is adjustable longitudinally with respect to the shaping dies to vary the amount of the swage, it being moved forwardly to increase the swage, and rearwardly to lessen the same, the adjustment of a single fastening means, viz: the set screw 8, being all that is necessary to secure this result.

The transversely disposed shaping dies, which are reversible to present either end to the teeth of the saw, are square in cross section and their ends are beveled at the corners to form four tooth engaging faces 29 and a central flat end abutment face 30. By providing four beveled tooth engaging faces at each end of the shaping die, the latter is equipped with eight of such faces, and may be reversed or adjusted to present any one of the said faces for engaging the saw teeth. The shaping dies, which are arranged in inner rectangular portions 31 of the transverse openings in the block or body, are provided with central threaded bores or openings 32, extending longitudinally of the dies and receiving threaded terminal portions 33 of connecting screws 34, which pierce transversely disposed die actuating screws 35. The die actuating screws, which are right and left hand threaded, engage right and left hand screw threads of enlarged outer portions 36 of the transverse openings of the block or body. The outer threaded portions of the transverse openings of the block and the die actuating screws are of greater diameter than the dies, which are directly engaged by the said actuating screws. By this construction the rectangular dies may be readily introduced into the inner portions of the transverse openings of the block or body through the outer enlarged threaded portions of the said openings. The die actuating screws are provided with central smooth longitudinal bores or openings 37, for the reception of rounded portions of the connecting screws 34, which are provided at their outer ends with heads for engaging the outer ends of the screws 35. By connecting the dies with the actuating screws they are positively moved outwardly and inwardly when the screws are partially rotated by an oscillatory operating device 38.

The oscillatory operating device, which straddles the block, comprises in its construction a central shank member 39 and side arms or levers 40, adjustably connected at their upper ends to the shank member and at their lower ends to the die actuating screws. The lower ends of the arms are provided with enlarged circular portions or hubs 40ª, which receive circular collars or bushings 41, provided with rectangular openings 42 for the reception of outer reduced squared portions 43 of the die actuating screws. The bushings, which are removable from the openings of the arms or levers of the oscillatory operating device, are provided at the top with upwardly projecting tapering tongues 44, which are secured in correspondingly shaped recesses 45 of the arms or levers 40 by screws 46 or other suitable fastening devices. The screws pierce the arms or levers 40 above the heads or enlargements and pass through openings in the tongues 44 of the bushings 41. The outer reduced polygonal portions 43 of the die actuating screws are slidable in the openings of the collars 41, and the said screws are adapted to move inwardly and outwardly when the operating device 38 is oscillated. The arms or levers 40 are provided at their upper ends with curved portions 47 extending in advance and in rear of the shank member 39, and provided with arcuate slots 48 for the reception of an adjusting bolt 49, which also passes through a transverse opening 50 in the shank member 39. The shank member 39, which consists of a block or piece, is provided in its side faces with recesses 51, which have curved top walls and receive the curved portions 47 of the arms or levers 40. The adjusting bolt is equipped at one end with a head and at the other end with a nut, and is adapted to be tightened to secure the arms or levers in their adjustment. The arms or levers are capable of relative adjustment to arrange the dies in proper position, so that the teeth may, in the shaping operation, be bent or flexed past the center when necessary to insure the teeth being left in a central position in alinement with one another. By connecting the dies with the oscillatory operating device and simultaneously rotating the adjusting screws, it will be impossible for one die to move in advance of the other, and an accurate shaping of the saw teeth is obtained. The central connecting or shank member is equipped with an upwardly extending handle or grip 52 which is secured to an integral tang 53, but any other suitable means may be employed for mounting the handle of the central connecting or shank member 39. In order to enable the saw shaper to be accurately guided along the saw, it is equipped at the lower face of the block or body 1 with adjustable guiding plates 54, fitted flat against the lower face of the block at opposite sides of the vertical opening and provided at their inner edges with recesses 55 and having depending vertical guiding flanges 56 located in advance and in rear of the recesses 55. The recesses 55 form an enlarged opening or space between the guiding plates between the intermediate portions of the inner edges of the guiding plates, which are provided with transverse slots 57 for the reception of screws 58 or other suitable fastening devices, for securing the guiding plates to the block or body 1. The screws 58 are mounted in threaded perforations or bores of the block, and they are also adapted to secure the shank 59 of a handle 60 to the lower face of the block or body. The handle 60, which is adapted to be arranged at either side of the block or body, projects laterally from the same. The handle 60 enables the operator to hold the shaper in proper position on the saw and the screws 58, which are preferably three in number for each of the guiding plates, permit an adjustment of the handle at each side of the shaper. By removing the gage bar and turning it end for end to reverse the tooth stop, the saw shaper may be arranged so that the dies can be operated either by pulling the oscillatory handle toward the operator or by pushing the same from him.

What is claimed is:

1. A saw shaper of the class described including a saw shaper body having a saw receiving opening enlarged at the top to form a way, a gage bar slidable in the way and supported by the walls thereof, said gage bar being provided with a tooth stop, and clamping means mounted on the body for exerting pressure against the gage bar to force the same into frictional engagement with the walls of the way.

2. A saw shaper of the class described including a body provided with a saw receiving opening enlarged at the top to form a way and provided in the upper wall thereof with a groove, a gage bar slidably supported in the way and carrying a tooth stop, a clamping plate extending through the groove and bearing against the gage bar, said plate having projecting terminals engaging the said body, and a screw piercing the upper portion of the body and engaging the clamping plate.

3. A saw shaper of the class described including a body having a saw receiving opening enlarged at the top to form a way, the latter being substantially circular in cross section, a gage bar slidable in the way and supported by the walls thereof, said gage bar being segmental in cross section to conform to the configuration of and be capable of rotary adjustment in the said way and presenting a lower flat face adapted to rest upon the saw teeth, and a tooth stop carried by the gage bar.

4. A saw shaper of the class described including a body having a saw receiving opening, a laterally movable tooth stop arranged to engage the saw teeth, and means for yieldably maintaining the tooth stop in a central position.

5. A saw shaper of the class described including a body having a saw receiving opening, a pivotally mounted tooth stop arranged to move laterally, and means for yieldably maintaining the tooth stop in position for engaging the saw teeth.

6. A saw shaper of the class described including a body having a saw receiving opening, a tooth stop provided with a stem or pivot and movable laterally on the same, and a spring connected with the stem or pivot and yieldably maintaining the tooth stop in position for engaging the saw teeth.

7. A saw shaper of the class described including a body having a saw receiving opening, a laterally movable tooth stop provided with a stem or pivot having a slot, and a spring engaging the slot of the stem or pivot and yieldably maintaining the tooth stop in position for engaging the saw teeth.

8. A saw shaper of the class described including a body having a saw receiving opening, a gage bar mounted in the said opening, a laterally movable tooth stop having a stem or pivot mounted on the gage bar, and a spring also carried by the gage bar and connected with the stem or pivot for yieldably maintaining the tooth stop in position for engaging the saw teeth.

9. A saw shaper of the class described including a body having a saw receiving opening, a gage bar mounted in the opening, a laterally movable tooth stop located beneath and carried by the gage bar and having a stem or pivot extending upwardly through the said gage bar, and a spring mounted upon the gage bar and connected with the stem or pivot for yieldably maintaining the tooth stop in position for engaging the saw teeth.

10. A saw shaper of the class described including a body having a saw receiving opening, a gage bar slidably mounted in and extending through the opening, a tooth stop located beneath the gage bar and provided with a stem or pivot extending upwardly through the same and projecting therefrom, the projecting portion of the stem or pivot being slotted and exteriorly threaded, a spring mounted on the gage bar and extending through the slot of the stem or pivot, and nuts mounted on the threaded portion of the stem or pivot and arranged above and below the spring.

11. A saw shaper of the class described including a body having a saw receiving opening and a saw stop provided with a tapering recess arranged to receive the point of a saw tooth, said recess having a horizontal top wall to rest upon the top of the saw and beveled at the front of the said top wall, said recess presenting an inclined face for engaging beneath the point of the tooth.

12. A saw shaper of the class described including a body having a saw receiving opening and a yieldably mounted laterally movable tooth stop oppositely beveled at the side faces to provide a longitudinal tapered portion.

13. A saw shaper of the class described including a body having a saw receiving opening, transversely disposed shaping dies located at opposite sides of the said opening and reversible to present either end to a saw, die actuating screws mounted in the body and directly engaging the outer ends of the dies, and connecting screws projecting centrally from the inner ends of the adjusting screws and securing the said dies to the same, whereby the dies are positively moved both inwardly and outwardly by the adjusting screws.

14. A saw shaper of the class described including a body having a saw receiving opening, transversely disposed shaping dies located at opposite sides of the opening and reversible to present either end to a saw, die actuating screws mounted in the body and abutting against the outer ends of the dies, and means for securing the dies to the screws to cause a positive inward and outward movement of the dies and for permitting the dies to be turned end for end.

15. A saw shaper of the class described including a body having a saw receiving opening, transversely disposed shaping dies located at opposite sides of the said opening and reversible to present either end to a saw, die actuating screws mounted in the body and directly engaging the outer ends of the dies, and connecting screws piercing the die actuating screws and the said dies and permitting the dies to be turned end for end, said connecting screws being also provided with means for engaging the actuating screws at the outer ends thereof.

16. A saw shaper of the class described including a body having a saw receiving opening, transversely disposed shaping dies slidably mounted in the body at opposite sides of the opening, right and left hand threaded screws also mounted in the body and arranged to actuate the dies, said screws having outer polygonal portions, and an oscillatory operating device comprising diverging arms or levers provided with openings, bushings mounted in the said openings and having polygonal openings slidably receiving the polygonal portions of the actuating screws, said bushings having projecting tongues, and fastening means for securing said tongues to the arms or levers.

17. A saw shaper of the class described including a body having a saw receiving opening, transversely disposed right and left hand threaded screws mounted in the body at opposite sides of the opening, dies actuated by the screws, an oscillatory operating device comprising arms or levers slidably interlocked with the screws and provided with top portions having arcuate slots extending in advance and in rear of the levers, and a handle provided with means operating in the said slots and adjustably connecting the arms or levers.

18. A saw shaper of the class described including a body having a saw receiving opening, transversely disposed right and left hand threaded screws mounted in the body at opposite sides of the opening, dies actuated by the screws, an oscillatory operating device comprising arms or levers slidably interlocked with the screws and provided with top portions having arcuate slots extending in advance of and in rear of the levers, a shank member interposed between the arms or levers and provided with a handle, and a fastening device carried by the shank member and operating in the said slots to adjustably secure the arms or levers to the shank member.

19. A saw shaper of the class described including a saw shaper body having a longitudinal saw receiving opening, a longitudinally disposed gage bar slidable in the opening and extending outwardly beyond the body, and a tooth stop carried by the gage bar and having attaching means located beyond the end of the body and adjustable exteriorly of the same.

In testimony, that I claim the foregoing as my own, I have hereto affixed my signature in the presence of two witnesses.

JEROME B. RICKER.

Witnesses:
J. H. POWELL,
F. O. SCHMIDT.

Copies of this patent may be obtained for five cents each, by addressing the "Commissioner of Patents, Washington, D. C."